United States Patent [19]

Suslin et al.

[11] 4,093,530
[45] June 6, 1978

[54] DEVICE FOR ELECTROCHEMICAL TREATMENT OF WORKPIECES

[76] Inventors: Vladimir Isaakovich Suslin, ulitsa Frunze, 17, kv. 46; Alexandr Ivanovich Dubovik, ulitsa Gvardeitsev Shironintsev, 63 A, kv. 22; Boris Anatolievich Makeev, ulitsa Novgorodskaya, 6, kv. 29; Pavel Semenovich Razdymakha, ulitsa Bljukhera, 26, kv. 121; Zinovy Abramovich Lekarev, ulitsa Trinklera, 20, kv. 71, all of Kharkov, U.S.S.R.

[21] Appl. No.: 799,119

[22] Filed: May 20, 1977

[51] Int. Cl.² .................. B23P 1/02; C25B 15/08
[52] U.S. Cl. .............. 204/224 M; 204/225; 204/237; 204/275
[58] Field of Search .......... 204/237, 225, 275, 224 M, 204/224 R, 129.35

[56] References Cited

U.S. PATENT DOCUMENTS

| 3,449,226 | 6/1969 | Williams | 204/237 X |
| 3,841,990 | 10/1974 | Sasaki et al. | 204/225 X |
| 3,956,096 | 5/1976 | Paulson et al. | 204/237 |

FOREIGN PATENT DOCUMENTS

| 313,640 | 9/1971 | U.S.S.R. | 204/224 M |

*Primary Examiner*—Howard S. Williams
*Assistant Examiner*—D. R. Valentine
*Attorney, Agent, or Firm*—Robert E. Burns; Emmanuel J. Lobato; Bruce L. Adams

[57] ABSTRACT

Device for electrochemical treatment of workpieces includes a change-over means for actuating the delivery of the workpiece of an electrolyte or a washing medium and their discharge after the workpiece is treated. This change-over means consists of a distribution valve, a control element and a mechanism for separating the discharge of the electrolyte and the washing medium. The distribution valve is located at the junction of separate conduits for the electrolyte and washing medium and operatively connected with the control element so that the distribution valve shuts off alternately the conduit for the electrolyte or the conduit for the washing medium. The mechanism for separating the discharge of the electrolyte and the washing medium is located in an intermediate chamber disposed directly under the working chamber and is operatively connected with the control element through the distribution valve so that the mechanism serves to discharge the electrolyte or the washing medium according to their respective delivery through the distribution valve. This arrangement of the device makes for its simplified construction and more reliable operation.

1 Claim, 10 Drawing Figures

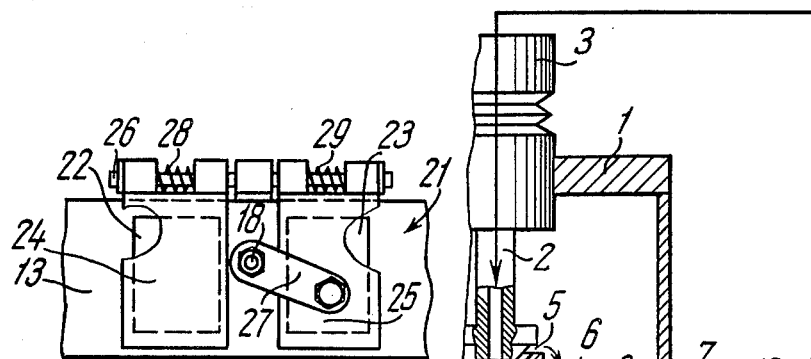
FIG. 4
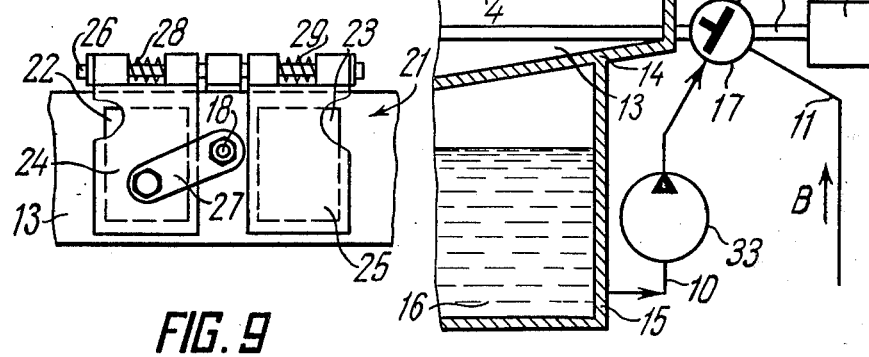
FIG. 9
FIG. 6
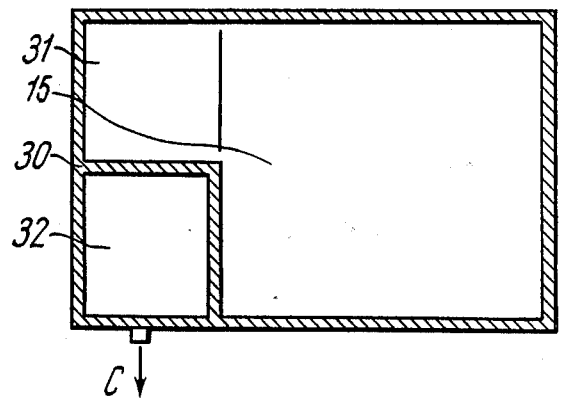
FIG. 5

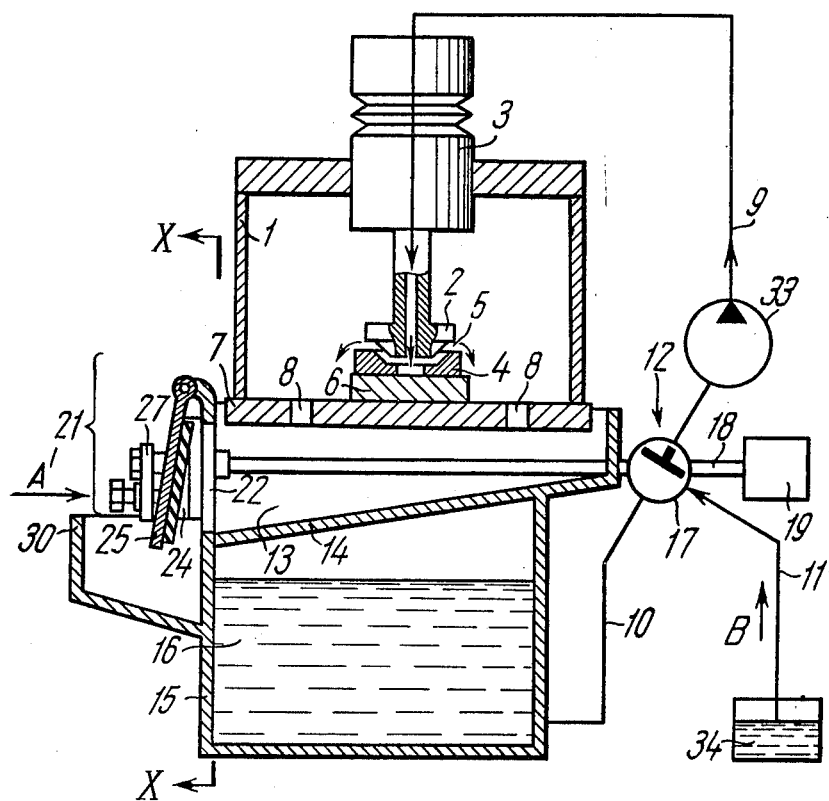
FIG.8
FIG.7
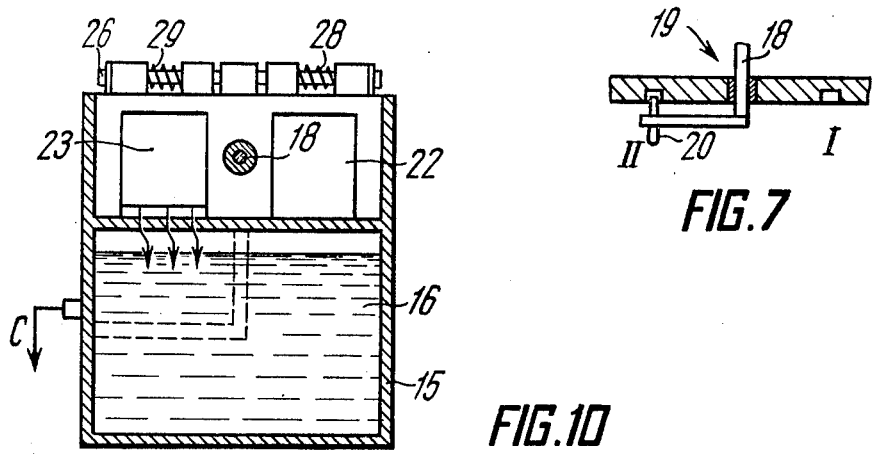
FIG.10

DEVICE FOR ELECTROCHEMICAL TREATMENT OF WORKPIECES

A BACKGROUND OF THE INVENTION

The present invention relates to a device for treatment of workpieces and, more particularly, to electrochemical treatment device and can be used for treatment of a metallic workpiece with electrolyte and subsequently washing it with a washing medium.

Known in the art is a device for electrochemical treatment of workpieces having a working chamber which houses a tool and a workpiece. Electrolyte is delivered into the working gap between the tool and the workpiece from an electrolyte feed tank whereto this electrolyte is discharged after the treatment of the workpiece is completed.

The workpiece thus treated is then transferred to another device for subsequent treatment, i.e. washing. While the workpiece is exposed to air, the substances resulting from the processing are deposited on the workpiece surface and the subsequent treatment of the workpiece becomes difficult to carry out.

There is also known a device for electrochemical treatment of workpieces wherein the workpiece is washed in position directly after treatment.

This device has a working chamber housing the tool and the workpiece with a working gap therebetween, and into this working gap electrolyte and a washing medium are alternately delivered through a common conduit joining respective separate conduits for the electrolyte and the washing medium after their junction. The electrolyte and the washing medium are carried off separately with the aid of a change-over means actuating the delivery of the workpiece of the electrolyte or the washing medium and the discharge thereof, after the workpiece is machined, into the electrolyte feed tank and into a drain, respectively.

The change-over means for actuating the delivery to the workpiece of the electrolyte or the washing medium and their discharge after the machining incorporates separate valves in each of said conduits, on which conduits respective pumps are also installed. On applying voltage to the tool and the workpiece, electrolyte is delivered by means of the respective pump from its feed tank along its respective conduit through its valve and further, along the common conduit, into the working gap between the workpiece and the tool and is then carried off from the working chamber through a conduit into an intermediate chamber separate from the latter. By means of a separate pump, the electrolyte is directed through a conduit and a separate valve back into the feed tank. On the completion of treatment, the valves located on the conduits for the electrolyte are closed, and the respective pump supplies the washing medium into the working gap, this washing medium passing through its respective conduit, valve and the common conduit, and cleaning at the same time, the whole system. After the workpiece is washed, the washing medium is carried off from the working chamber through the same conduit as the electrolyte into the same intermediate chamber and therefrom, with the aid of a separate pump, into a drain. To treat a subsequent workpiece, the working cycle is repeated.

As follows from the foregoing description, all the valves in the known apparatus are controlled separately, which results in more complex construction of the apparatus and its lowered operational reliability.

SUMMARY OF THE INVENTION

An object of the present invention is to provide a device for electrochemical treatment featuring a simple construction.

Another object of the invention is to provide a device for electrochemical treatment with improved reliability of operation.

These objects are accomplished by providing a device for electrochemical treatment of workpieces including a working chamber which houses a tool and a workpiece with a working gap therebetween, into which gap an electrolyte and a washing medium are alternately supplied through a common conduit joining separate conduits for the electrolyte and the washing medium respectively, downstream of their junction, and from which clearance the electrolyte and the washing medium are carried away separately with the aid of a change-over means actuating the delivery to the workpiece of the electrolyte or the washing medium and the discharge thereof, after the workpiece is treated, through an intermediate chamber into an electrolyte feed tank and into a drain, respectively, in which apparatus, according to the invention, said change-over means consists of a distribution valve located at the junction of the separate conduits, a control element operatively connected with the distribution valve so that this valve alternately shuts off the conduit for the electroelectrolyte and the conduit for the washing medium, and a mechanism for separating the discharge of the electrolyte from that of the washing medium, disposed in the intermediate chamber and kinematically interconnected through the distribution valve with the control element so that this mechanism carries out the discharge of the electrolyte or the washing medium according to their respective delivery through the distribution valve, the intermediate chamber being disposed directly under the working chamber.

Preferably, at least one pair of ports for the respective discharge of the electrolyte and the washing medium is provided in one of the walls of the intermediate chamber, and the mechanism for separating the discharge of electrolyte from that of the washing medium is furnished with flaps whose number corresponds to the number of the windows, which flaps are hinged on an axle, and with a rod one end whereof is connected through the distribution valve to the control element and the second end carries a cam alternately interacting with each flap in accordance with the respective operative position of the distribution valve.

This arrangement of the electrochemical treatment device according to the invention provides for its simplified construction and better performance.

BRIEF DESCRIPTION OF THE DRAWINGS

Embodiments of the invention will now be described by way of example with reference to the accompanying drawings, in which:

FIG. 4 is a view in the direction of the arrow A of FIG. 1;

FIG. 5 is a section taken along the line V—V of FIG. 1;

FIG. 6 is a general schematic view, partly broken away, of another embodiment of the device according to the invention;

FIG. 7 shows an alternative position of the control element of FIG. 2;

FIG. 8 shows an alternative position of the distribution valve of FIG. 1;

FIG. 9 is a view in the direction of the arrow A' of FIG. 8; and

FIG. 10 is a section taken along the line X—X of FIG. 8.

DESCRIPTION OF THE PREFERRED EMBODIMENT

Figure 1:
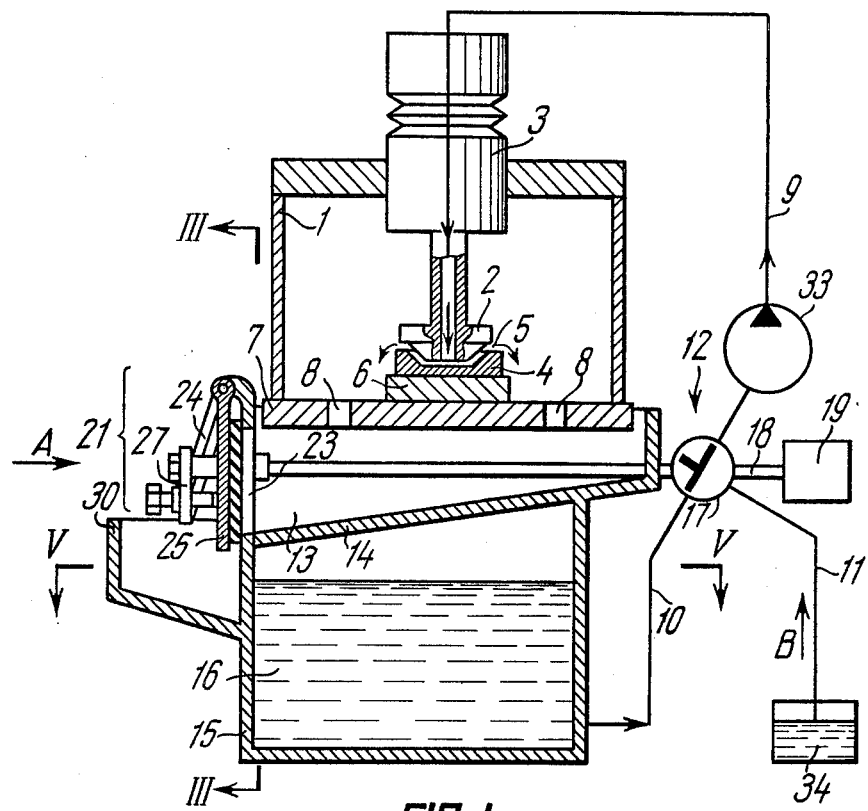
FIG. 1 is a general schematic illustration of the device for electrochemical treatment according to the invention.

Referring now to FIG. 1 of the drawings, the device for electrochemical treatment according to the invention has a working chamber 1 which houses a tool 2, provided with a drive 3, and a metallic workpiece 4 (the drawing shows a gear-type workpiece). There is a working gap 5 between the tool 2 and the workpiece 4 during the treatment. The workpiece 4 is placed in a supporting fixture 6 which, in turn, is disposed on the work table 7 of the chamber 1. Passages 8 are provided in the work table to carry away electrolyte and a washing medium for which water is used in this case.

The electrolyte and the washing medium are alternately delivered into the working gap 5 between the tool 2 and the workpiece 4 through a common conduit 9 joining separate conduits 10 and 11 for the electrolyte and the rinsing medium, respectively, downstream of their junction. The electrolyte and the washing medium are separately discharged with the aid of a change-over means 12 actuating the delivery to the workpiece 4 of the electrolyte or the washing medium and their discharge, after the workpiece 4 is treated, through an intermediate chamber 13. The latter is disposed just under the working chamber 1. Under the bottom 14 of the chamber 13, a feed tank 15 for electrolyte 16 is arranged, whereto the electrolyte is discharged after treatment of the workpiece 4 and wherefrom the electrolyte is supplied through the conduit 10 for treating the workpiece 4. The washing medium for which, as said hereinbefore, water is taken is discharged after washing the workpiece 4 into a drain and is delivered to wash the workpiece 4 through the conduit 11 in the direction of the arrow B.

The change-over means 12 has a plug-type distribution valve 17 located in the junction of the separate conduits 10 and 11 and operatively connected through a rod 18 with a control element 19 so that the valve 17 shuts off alternatively the conduit 10 for electrolyte or conduit 11 for the washing medium.

Figure 2:
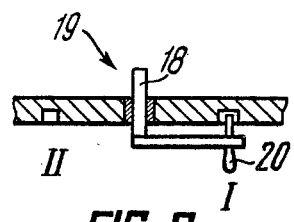
FIG. 2 is a sectional side view of the control element in the device according to the invention.

The control element 19 (FIG. 2) is made in the form of a handle 20 connected to one end of the rod 18 and having two fixed operative positions I and II to actuate the delivery of the electrolyte or the washing medium.

The change-over means 12 (FIG. 1) also incorporates a mechanism 21 for separating the discharge of the electrolyte from that of the washing medium, disposed in the intermediate chamber 13 and operatively connected by means of the rod 18, extending through the distribution valve 17, with the control element 19 so that this mechanism 21 carries out the discharge of the electrolyte or the washing medium in accordance with their respective delivery through the distribution valve.

We have described heretofore the apparatus according to the invention with a manual control element. However, an electro-mechanical, air- or hydraulically-operated, or any other type of drive suitable for the purpose may be used where necessary.

One pair of ports 22 and 23 for the respective discharge of the electrolyte or the washing medium is provided in one of the walls of the intermediate chamber 13.

The mechanism 21 (FIG. 4) includes flaps 24 and 25, whose number corresponds to the number of windows 22 and 23, which flaps are hinged on an axle 26, and the rod 18 one end of which is connected through the distribution valve 17 (FIG. 1) to the control element 19 and the other end carries a cam 27 (FIG. 4) alternately interacting with each flap 24 and 25 in accordance with the respective operative position of the distribution valve 17. Springs 28 and 29 serve to hold the respective flaps 24 and 25 in a normally open position.

A cavity 30 is provided in the electrolyte feed tank 15 (FIG. 1) divided into two sections 31 and 32 (FIG. 5) providing the respective discharge of the electrolyte back into the feed tank, and the washing medium, into a drain in the direction of the arrow C.

FIG. 1 shows an embodiment of the device according to the invention wherein a pump 33 for the delivery of the electrolyte and the washing medium, which is pumped from a tank 34, is disposed on the conduit 9 downstream of the distribution valve 17.

Alternatively, the pump 33 may be disposed on the conduit 10 upstream of the distribution valve 17, as shown in FIG. 6. In this case, however, the washing medium is supplied from the main water.

In the described embodiment of the invention, a pair of ports is made in one of the walls of the intermediate chamber. However, the ports may be made in any wall of the intermediate chamber, and also in bottom thereof. The device may have two or more pairs of ports in accordance with the number of working stations on the machine tool incorporating the device being proposed.

The mode of operation of the electrochemical treatment device according to the present invention in as follows.

Figure 3:
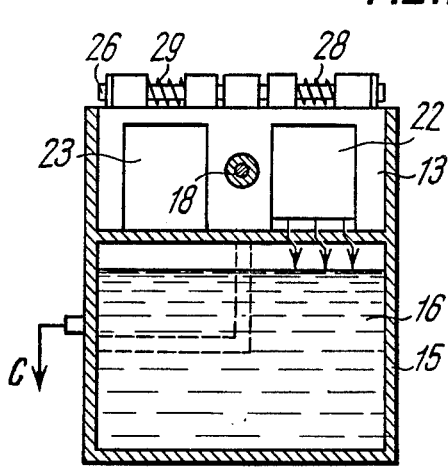
FIG. 3 is a section taken along on the line III—III of FIG. 1.

Electrolyte 16 is fed by the pump 33 from the feed tank 15 into the working gap 5 (FIG. 1) between the tool 2 and the workpiece 4, to which a negative and a positive potentials, respectively, are applied. Here, the distribution valve 17 brings the pump 33 into communication with the conduit 10, wherethrough the electrolyte is delivered out of the feed tank 15. Electrochemical treatment of the workpiece follows. The electrolyte freely runs off from the working gap 5 through the passages 8 into the intermediate chamber 13, wherefrom it is discharged through the port 22 (FIG. 3) back into the feed tank 15.

On completion of treatment, the workpiece 4 (FIG. 1) is subject to washing with the washing medium. To this end, the handle 20 (FIG. 2) is brought out of the fixed operative position I and is turned into the position II (FIG. 7). Thereby, the rod 18 also turns, actuating the distribution valve 17 (FIG. 8) and turning the cam 27 (FIG. 9). The latter releases the flap 25 and actuates the flap 24, whereby the port 23 opens and the port 22 closes.

As a result of the change-over, the delivery of the electrolyte is shut off, and the washing medium is supplied out of the tank 34 through the distribution valve 17, pump 33, and the conduit 9 into the working gap 5

(FIG. 8), cleaning, at the same time, the whole system. The washing medium freely runs off from the working gap 5 through the passages 8 into the intermediate chamber 13 and is discharged therefrom through the port 23 (FIG. 10), which is now open, into the section 32 (FIG. 5), and further, into the drain in the direction of the arrow C.

Where the pump 33 (FIG. 6) is disposed upstream of the distribution valve 17, the device operates as is hereinbefore described, except that the washing medium is delivered from the water main rather than from the tank, and thus, the pump 33 takes no part in the delivery of the washing medium and is not washed.

The present electrochemical treatment device allows workpieces to be washed in position, immediately after the treatment under electric current, which results in significantly improved cleaning efficiency. The arrangement of the device makes it possible to wash the whole system which otherwise becomes fouled with the substances forming in the process of electrochemical treatment.

What is claimed is:

1. A device for electrochemical treatment of workpieces comprising:

a working chamber having a bottom and passages made in said bottom;

a tool disposed within said working chamber, a negative potential being applied to said tool in the course of treatment of a workpiece also disposed within said working chamber, to which workpiece a positive potential is applied;

a drive for said tool;

a working gap formed between said tool and said workpiece in the course of treatment thereof, an electrolyte and a washing medium being alternately delivered into said clearance and carried away therefrom separately through said passages;

an intermediate chamber with walls, said intermediate chamber being disposed directly under said working chamber and receiving said electrolyte and said washing medium alternately coming therein through said passages;

a feed tank for said electrolyte delivered into said working gap for treatment of said workpiece and discharged into the same feed tank from said intermediate chamber after said workpiece is treated;

a separate conduit for said electrolyte, communicating with said feed tank;

a water main for said washing delivered into said working gap for washing said workpiece and discharged into a drain from said intermediate chamber;

a separate conduit for said washing medium, communicating with said main and connected to said separate conduit for said electrolyte;

a common conduit for said electrolyte and said washing medium joining said separate conduits downstream of their junction and alternately delivering said electrolyte and said washing medium into said working gap;

a change-over means for actuating the delivery to said workpiece of said electrolyte or said washing medium and the discharge thereof, after the workpiece is treated, through said intermediate chamber, said change-over means consisting of a distribution valve located in said separate conduits, a control element operatively connected with said distribution valve so that said distribution valve alternately shuts off said conduit for the electrolyte or said conduit for the washing medium, a mechanism for separating the discharge of said electrolyte from that of said washing medium, disposed at said intermediate chamber and operatively connected through said distribution valve with said control element so that said mechanism carries out the discharge of the electrolyte or the washing medium according to their respective delivery through the distribution valve;

a pump for the delivery into said working clearance of said electrolyte from said electrolyte feed tank and said washing medium for said water main, or said electrolyte only;

at least one pair of ports for the respective discharge of said electrolyte and said washing medium, made in one of the walls of said intermediate chamber; flaps provided in said mechanism for separating the discharge of said electrolyte from that of said washing medium, the number of said flaps corresponding to the number of said ports; an axle on which said flaps are hinged; a rod in said mechanism for separating the discharge of said electrolyte from that of said washing medium, having a first end and a second end, said first end being connected through said distribution valve with said control element; and a cam mounted on said second end of said rod and alternately interacting with each of said flaps in accordance with the operative position of said distribution valve.

* * * * *